United States Patent
Schultz

(10) Patent No.: US 7,543,186 B2
(45) Date of Patent: Jun. 2, 2009

(54) SYSTEM AND METHOD FOR IMPLEMENTING SOFTWARE BREAKPOINTS

(75) Inventor: Russell A. Schultz, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 954 days.

(21) Appl. No.: 10/939,535

(22) Filed: Sep. 13, 2004

(65) Prior Publication Data

US 2006/0069959 A1   Mar. 30, 2006

(51) Int. Cl.
*G06F 11/00* (2006.01)
(52) U.S. Cl. .................................. 714/35; 717/129
(58) Field of Classification Search ............... 714/35; 717/129
See application file for complete search history.

(56) References Cited

U.S. PATENT DOCUMENTS

| | | | |
|---|---|---|---|
| 4,817,092 A * | 3/1989 | Denny ........................ 714/10 |
| 5,319,645 A * | 6/1994 | Bassi et al. .................. 714/38 |
| 6,106,572 A * | 8/2000 | Halpern ...................... 717/130 |
| 6,128,727 A * | 10/2000 | Gray et al. .................. 712/227 |
| 6,279,123 B1 * | 8/2001 | Mulrooney .................. 714/35 |
| 6,286,114 B1 | 9/2001 | Veenstra et al. |
| 6,378,124 B1 | 4/2002 | Bates et al. |
| 6,378,125 B1 | 4/2002 | Bates et al. |
| 6,480,818 B1 | 11/2002 | Alverson et al. |
| 6,499,123 B1 | 12/2002 | McFarland et al. |
| 6,587,967 B1 | 7/2003 | Bates et al. |
| 6,658,578 B1 | 12/2003 | Laurenti et al. |
| 6,658,600 B1 | 12/2003 | Hogdal et al. |
| 6,658,649 B1 | 12/2003 | Bates et al. |
| 6,681,384 B1 | 1/2004 | Bates et al. |
| 7,032,213 B1 * | 4/2006 | Lupu et al. .................. 717/129 |
| 2003/0014736 A1 * | 1/2003 | Nguyen et al. .............. 717/129 |
| 2003/0106046 A1 * | 6/2003 | Arnold et al. ............... 717/129 |
| 2006/0037003 A1 * | 2/2006 | Long et al. .................. 717/127 |

OTHER PUBLICATIONS

Webopedia. PDA. Apr. 7, 2001. [retrieved on Nov. 2, 2008]. Retrieved from the Internet: <URL:http://web.archive.org/web/20010407121755/http://www.webopedia.com/TERM/P/PDA.html>.*
Popular Mechanics. World's First MP3 Phone. Oct. 2000. [retrieved on Nov. 2, 2008]. Retreived from the Internet: <URL:http://www.popularmechanics.com/technology/upgrade/1279751.html>.*

* cited by examiner

*Primary Examiner*—Scott T Baderman
*Assistant Examiner*—Paul F. Contino
(74) *Attorney, Agent, or Firm*—Toler Law Group

(57) ABSTRACT

The disclosure is directed to a method of loading a breakpoint enabled page of a computer program into a computer readable memory. The method includes identifying a page of a computer program to be loaded into the computer readable memory and reading a breakpoint table to identify a set of breakpoints having memory addresses located within the page of the computer program prior to loading the page of the computer program. Each breakpoint has an instruction address and an instruction storage location. For each of the set of breakpoints, the method includes reading an operating instruction of the page of the computer program located at the instruction address, storing a copy of the operating instruction at the instruction storage location within the breakpoint table, and loading a trap instruction at the instruction address to replace the operating instruction in the page of the computer program to create a breakpoint enabled page of the computer program.

28 Claims, 5 Drawing Sheets

| BUSY FLAG | CHECKSUM | | | |
|---|---|---|---|---|
| ENTRY | TID | TIA | INST | TASK |
| 0 | A | 06 | AF | TASK 1 |
| 1 | B | 11 | AK | TASK 1 |
| 2 | C | 08 | | TASK 2 |
| 3 | D | 32 | BD | TASK 1 |

SYSTEM AND METHOD FOR IMPLEMENTING SOFTWARE BREAKPOINTS

FIELD OF THE DISCLOSURE

The disclosure, in general, relates to systems and methods for implementing software breakpoints.

BACKGROUND

The act of writing and modifying software often introduces errors, termed "bugs," in software code. Generally, software programmers use "debugger" programs to analyze and find these errors. Typically, these debugger programs permit placement of breakpoints within software code to stop operation of the code at specific points of interest. After reaching the breakpoint, the programmer may review variable values, make changes to the code, or step through the subsequent code instruction by instruction.

However, typical breakpoint methods perform poorly for embedded systems with limited physical memory. In applications where virtual memory is used, parts of a program are paged into the physical memory from a source. In these applications, it is difficult to set software breakpoints because a particular page of a program may not be in memory, and breakpoints may be lost when a page is transferred in and out of the physical memory.

Traditional breakpoint methods also work poorly for multithreaded systems. Typically, when a breakpoint is set, the debugger also identifies a thread to which the breakpoint applies. When the program is run, the system stops at the breakpoint and performs a test to determine whether the breakpoint applies to the thread in which it was found. This test may be performed many times during a debug session, leading to slow performance. In addition, implementing the test thread evaluation introduces another source of errors that may be introduced into the software code.

As such, there is a need for improved systems and methods for implementing software breakpoints.

SUMMARY

In a particular embodiment, the disclosure is directed to a method of loading a breakpoint enabled page of a computer program into a computer readable memory. The method includes identifying a page of a computer program to be loaded into the computer readable memory. The method also includes reading a breakpoint table to identify a set of breakpoints having memory addresses located within the page of the computer program prior to loading the page of the computer program. Each breakpoint in the set of breakpoints has an instruction address and an instruction storage location. For each of the set of breakpoints, the method includes reading an operating instruction of the page of the computer program located at the instruction address, storing a copy of the operating instruction at the instruction storage location within the breakpoint table, and loading a trap instruction at the instruction address to replace the operating instruction in the page of the computer program to create a breakpoint enabled page of the computer program. The method further includes loading the breakpoint enabled page of the computer program into the computer readable memory.

In another exemplary embodiment, the disclosure is directed to an embedded system including a processor and memory accessible to the processor. The memory includes a breakpoint table including a set of entries. Each entry of the set of entries identifies an instruction address and includes a storage cell for a replaced instruction. The memory also includes computer implemented instructions operable by the processor to access the breakpoint table and to insert a trap instruction associated with each of the set of entries included in the breakpoint table at the identified instruction addresses within a program page prior to loading the program page for execution.

In a further embodiment, the disclosure is directed to a system including a host computer and an embedded system. The host computer includes debugger software. The embedded system is accessible to the host computer and includes a processor and memory. The memory is accessible to the processor and includes a breakpoint table including a set of entries. Each entry of the set of entries identifies an instruction address associated with an instruction included in a page of a program that is to be replaced by a trap instruction. Each entry includes a storage cell for storing the replaced instruction.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWING(S)

In a particular embodiment, the disclosure is directed to a system including a host system and an embedded system. The host system includes debugger software and a program for execution. In addition, the host system prepares a breakpoint table including locations of breakpoints to be inserted into the program to stop the program at specific instruction locations during execution of the program. The embedded system includes a processor and memory. The memory includes a paging mechanism. The host system transfers the program and the breakpoint table to the embedded system. Generally, the program is larger than available memory space on the embedded system. Therefore, the paging mechanism loads portions, termed pages, of the program into the memory as desired. During debugging operations, the paging mechanism accesses the breakpoint table to determine where breakpoints are to be inserted and inserts the breakpoints at specified locations within a page to be loaded into memory.

Figure 1:
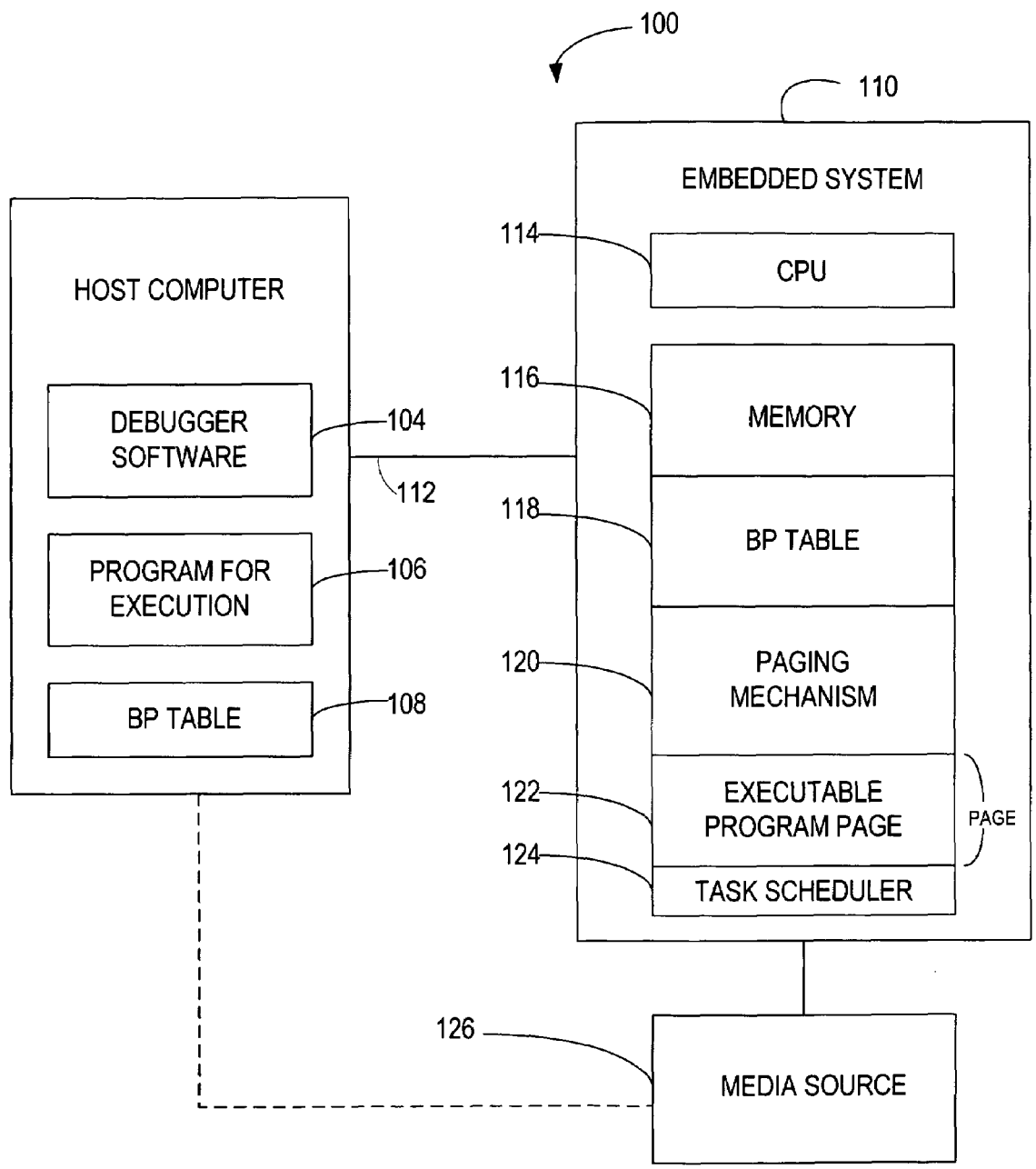
FIG. 1 is a block diagram illustrating an exemplary system for debugging embedded software.

FIG. 1 is a block diagram illustrating an exemplary system for debugging programs. The system 100 includes a host computer 102 and an embedded system 110. The host computer 102 includes debugger software 104 and a program for execution 106. In one exemplary embodiment, an operator of the debugger software 104 indicates a desire to insert a breakpoint at a specific location within the program 106. The debugger software 104 creates a breakpoint table 108 that includes an instruction location (e.g. address) and an instruction storage area (e.g. 8 bit field) to store an instruction that is to be replaced by a trap instruction associated with the breakpoint. The breakpoint table 108 may also include a task identifier associated with each breakpoint, a busy flag, and a checksum value.

The embedded system 110 includes a central processing unit (CPU) 114 and memory 116. In one exemplary embodiment, the embedded system is incorporated in a handheld device, such as a personal digital assistant (PDA) or an MP3 device. The embedded system 110 is connected to the host computer 102. For example, the embedded system 110 may interface with the host computer 102 via a debug interface, such as a JTAG interface. The embedded system 110 may also be connected to a media source 126. For example, the media source 126 may be a hard disk, optical storage, or a flash memory. In one particular embodiment, the media source 126 is a non-writeable memory. Exemplary embodiments of the media source 126 include non-writable memory, such as non-executable flash, write prohibited flash, NAND flash, NOR flash, serial EEPROM, serial Flash, and ROM based systems. In one exemplary embodiment, the media source 126 is embedded within the host computer 102 or accessible to the host computer 102.

The host computer 102 provides the breakpoint table 108 to the embedded system 110 for storage in the memory 116 as breakpoint table 118. The memory also includes a paging mechanism 120, executable program pages 122, and a task scheduler 124. In addition, the memory includes operating system kernels and instructions. During execution and debugging of a program, the paging mechanism 120 is operable by the CPU 114 to load pages of the program 106 into memory as desired. The paging mechanism 120 accesses the breakpoint table 118 to determine whether breakpoints are to be inserted into the loading page. For example, the breakpoint may include an entry indicating an instruction location, such as an instruction address, included in the page to be loaded. The paging mechanism 120 inserts a trap instruction at the instruction location indicated by the entry, stores the program instruction to be replaced by the trap instruction into the breakpoint table 118, and loads the breakpoint enabled page into the executable program pages 122. In another example, the breakpoint table 118 may include a task identifier. If the instruction location is to be used during an indicated task, the paging mechanism 120 inserts a trap instruction into the loading page.

When instructions from the loaded breakpoint enabled page are executed, the CPU 114 may halt at the trap instruction and await instructions from the debugger software 104. In this manner, a user of the debugger software 104 may observe and analyze the execution of the program, such as through monitoring variable values and stepping through subsequent instructions. If the user indicates a desire to step through the program, the CPU 114 executes the program instruction that was replaced by the trap instruction and that is stored in the breakpoint table 118.

In one exemplary embodiment, the program may include multi-tasked instructions. The trap instructions stored in the breakpoint table 118 may include a task identifier field. In one particular embodiment, when a trap instruction is encountered, the task scheduler 124 may access the breakpoint table 118 to determine whether the trap instruction is associated with the particular executing task, such as through comparing the task identifier associated with the trap instruction with the task to be executed. If the trap instruction is not to be executed with the executing task, the task scheduler may replace the trap instruction with the operation instruction stored in the breakpoint table 118. In another exemplary embodiment, the paging mechanism 120 accesses the breakpoint table 118 to determine whether the trap instruction is to be inserted for a specific task and does not insert the trap instruction when the task identifier does not match the task to be executed.

Figure 2:
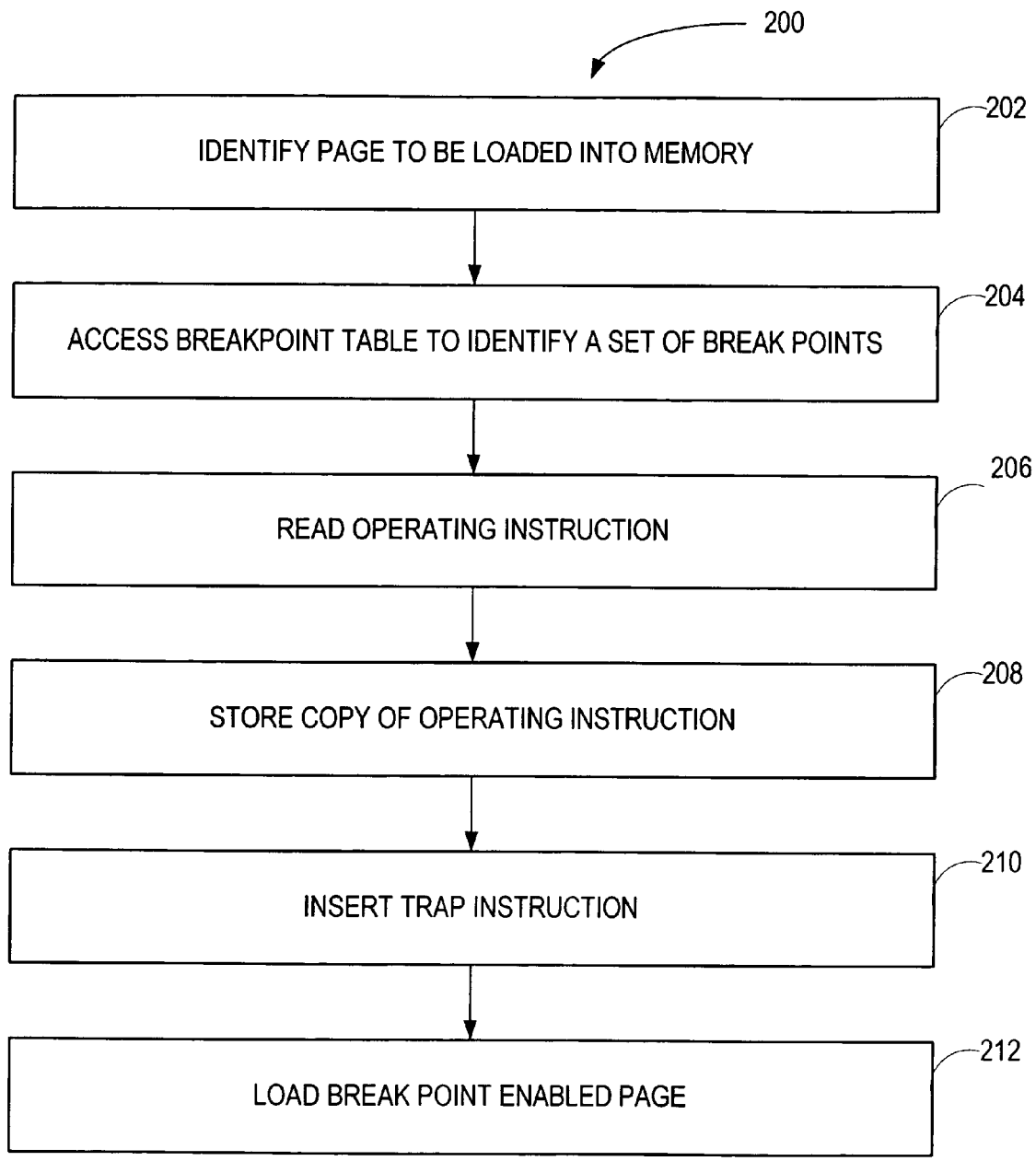
FIGS. 2 and 3 are flow diagrams illustrating exemplary methods for use by a debugging system, such as the system illustrated in FIG. 1.

FIG. 2 is a flow diagram illustrating an exemplary method for use by a debugging system, such as the system 100 illustrated in FIG. 1. Generally, the program to be debugged will have a size greater than the size of the computer readable memory. As such, pages of the program, each page having a size smaller than the computer readable memory, are loaded for execution from a media source storing the program. The paging mechanism identifies a page to be loaded into memory, as shown at step 202. For example, a page of program instructions may be loaded into memory from a media source, such as a source external to the embedded system. The paging mechanism accesses the breakpoint table, as shown at step 204, to identify a set of breakpoints or trap instructions to be inserted into the program instructions associated with the page to be loaded. For example, the paging mechanism may compare instruction numbers or locations stored in the breakpoint table to determine whether the instruction locations are within the set of instructions included in the loading page. In one exemplary embodiment, the paging mechanism may also change a "busy" flag associated with the breakpoint table to indicate that the paging mechanism is accessing the breakpoint table and thereby prevent access by the debugging software.

For each identified breakpoint, the paging mechanism reads the operating instruction from the page, as shown at step 206. The operating instruction is stored in the breakpoint table in an entry associated with the location of the instruction, as shown at step 208, and a trap instruction is inserted at the location in the page, as shown at step 210. Once trap instructions have been inserted for each of the identified breakpoints, the "busy" flag may be changed to allow the debugger program to access the breakpoint table. The breakpoint enabled page is loaded into the memory in preparation for execution by the CPU, as shown at step 212. The method illustrated in FIG. 2 may be repeat for loading of a second and subsequent pages.

When the CPU executes the instructions associated with the breakpoint enabled page, the CPU may halt program execution when a trap instruction is encountered and initiate a debug routine in the debugger software. In one exemplary embodiment, the debugger software may instruct the CPU to read the previously stored instruction associated with the trap instruction from the breakpoint table and execute the previously stored instruction.

Figure 3:
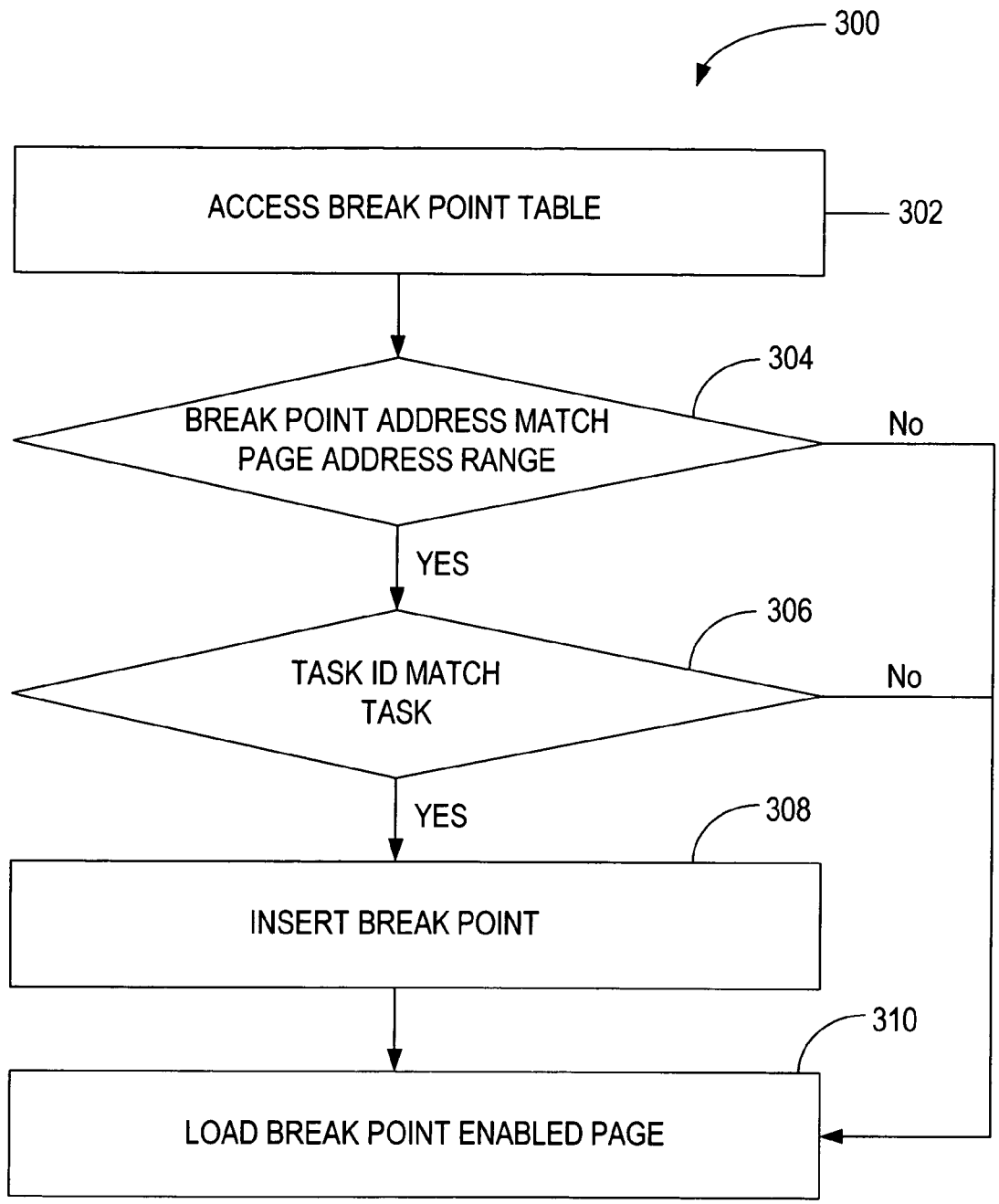

When accessing the breakpoint table, the paging mechanism may determine whether to insert trap instructions into the loading page based on a set of addresses associated with entries within the breakpoint table and/or based on task identifiers associated with the entries. In the exemplary method illustrated in FIG. 3, the paging mechanism accesses the breakpoint table, as shown at step 302. The addresses or instruction locations of each entry are compared to addresses or instruction locations of instructions included in the loading page, as shown at decision point 304. When none of the breakpoint entries include addresses included in the loading page, the page is loaded without inserting trap instructions. When an entry address is included in the page addresses, the system may insert a trap instruction, as shown at step 308, and the page is loaded, as shown at step 310.

In one exemplary embodiment, the system may test to determine whether the trap instruction is associated with a task to be executed. For example, entries in the breakpoint table may include task identifiers. As shown at decision point 306, when the task identifier does not match a task to be executed, the page may be loaded without insertion of a trap instruction corresponding to that breakpoint table entry. When the task identifier matches the task to be executed, the trap instruction associated with the entry may be inserted. In an alternative embodiment, the task identifier may be used by a task scheduler to determine when to allow the trap instruction to be executed and when to replace the trap instruction with the instruction stored in the breakpoint table.

Figures 4, 5:
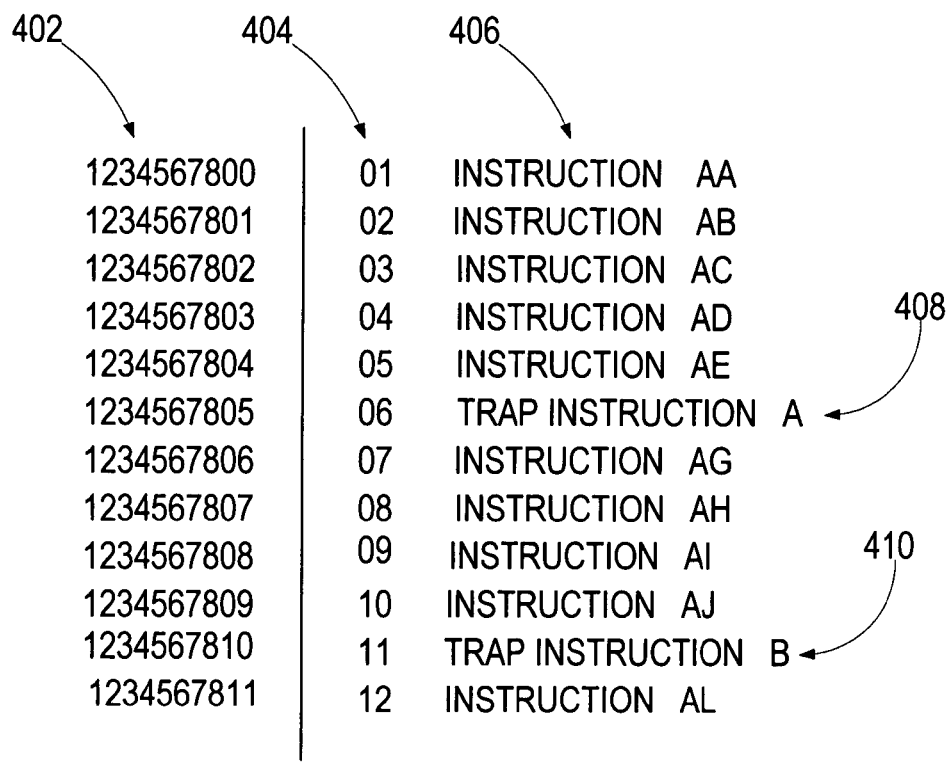
FIG. 4 is a general diagram illustrating an exemplary memory.
FIG. 5 is a general diagram illustrating an exemplary breakpoint table.

FIG. 4 illustrates an exemplary memory including a set of instructions associated with a breakpoint enabled page. Stored at addresses 402 within the memory are instructions 406. The instructions may be arranged by instruction number 404. As a page of instructions is loaded, a breakpoint table, such as the exemplary breakpoint table illustrated in FIG. 5, is accessed and instructions are replaced with trap instructions, such as trap instructions 408 and 410.

For example, the system may access a breakpoint table 500. When the page mechanism accesses the breakpoint table, the busy flag 502 is changed to prevent access by the debugger program. The table entries include an entry number, a trap identifier (TID), a trap instruction address (TIA), and a space for a replaced instruction (INST). In addition, the entries may include a task identifier (TASK). As the page illustrated in FIG. 4 is loaded, the system determines that the trap having TID "A" has a trap address (TIA) of "06" and TID "B" has a TIA of "11", while TID "D" has a TIA of "32". At instruction number 6 and instruction number 11, trap instructions, such as trap instructions 408 and 410, may be inserted and the replaced instructions, such as instructions AF and AK, are stored in the breakpoint table 500. If a page having instruction 32 is loaded, a trap instruction corresponding to TID "D" may be inserted. During execution of the page, the CPU may halt and await instructions from the debugger program when these trap instructions are encountered.

In one exemplary embodiment, the system may check the task identifier to determine whether to insert the trap instruction. For example, if the instructions of the page are to be executed during the performance of a Task 1, traps A and B may be inserted because they have a corresponding task identifier and trap C may not be inserted because it has a Task 2 identifier.

Once the trap instructions are inserted and the replaced instructions are stored in the breakpoint table, busy flag 502 may be changed to allow the debugger to access the breakpoint table 500. The breakpoint table 500 may also include a checksum value 504. The firmware associated with the embedded system may read the checksum value before accessing the table to determine whether the table has been corrupted. When the debugger replaces or modifies the table, the debugger may adjust the checksum value when the operation is complete.

Figure 6:
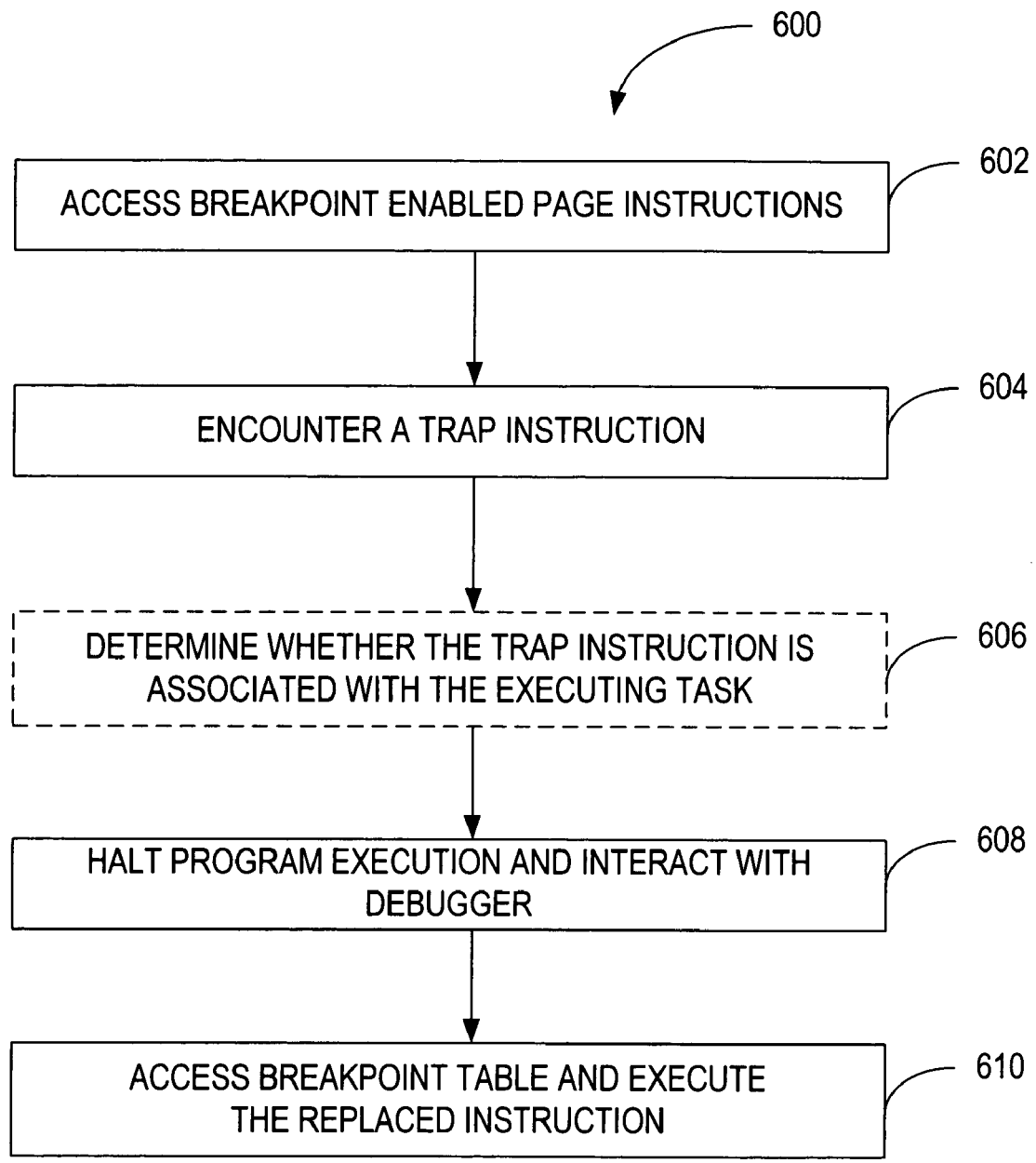
FIG. 6 is a flow diagram illustrating an exemplary method for use by a debugging system, such as the system illustrated in FIG. 1.

Once the breakpoint enabled page has been loaded into memory, it is accessible by the processor. FIG. 6 is a flow diagram illustrating an exemplary method for accessing the breakpoint enabled page. The system accesses the instructions associated with the breakpoint enabled page and operates accordingly, as shown at step 602. When the breakpoint enabled page includes a breakpoint or trap instruction, the system may encounter the trap instruction, as shown at step 604. In a multitasking environment, the breakpoints may be inserted in the breakpoint enabled page when the instructions to be replaced by the breakpoint are to be executed as part of a task identified in the breakpoint table. In an alternative embodiment, the system may check to determine whether the trap instruction is associated with the executing task, as shown at step 606. For example, a task scheduler may access the breakpoint table entry associated with the trap instruction to identify which tasks are associated with the trap instruction. In another embodiment, the breakpoint or trap instruction may be disabled by the real-time operating system kernel when the executing task is different than the task identified by the breakpoint table or the breakpoint or trap instruction may be enabled by the real-time operating system kernel when the executing task is the same as the task identified by the breakpoint table.

As shown at step 608, the system halts and communicates with debugger software on the host system. In this manner, a user of the debugger software on the host system may analyze and observe program performance. In one exemplary embodiment, the user may direct the debugger software to continue executing the program or step through the instructions. Based on the user input, the system accesses the breakpoint table to acquire an operable instruction previously replaced by the trap instruction and executes the operable instruction, as shown at step 610.

The above disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of loading a breakpoint enabled page of a computer program into a computer readable memory, the method comprising:
    identifying a page of a computer program to be loaded into the computer readable memory;
    prior to loading the page of the computer program, reading a breakpoint table to identify a set of breakpoints having memory addresses located within the page of the computer program, each breakpoint in the set of breakpoints having an instruction address, and an instruction storage location, and a task identifier;
    for each of the set of breakpoints, reading an operating instruction of the page of the computer program located at the instruction address, storing a copy of the operating instruction at the instruction storage location within the breakpoint table, and loading a trap instruction at the instruction address to replace the operating instruction in the page of the computer program when the task identifier of the respective breakpoint matches a task to be executed as checked before the trap instruction is loaded to replace the operating instruction, to create a breakpoint enabled page of the computer program; and
    loading the breakpoint enabled page of the computer program into the computer readable memory, wherein access to the breakpoint table by a debugger routine is prevented during creation and loading of the breakpoint enable page.

2. The method of claim 1, wherein the computer program has a total size that is greater than the size of the computer readable memory and wherein the page of the computer program has a size that is less than the size of the computer readable memory.

3. The method of claim 1, further comprising executing at least one of the trap instructions corresponding to at least one of the set of breakpoints and initiating a debug routine in response to executing the trap instruction.

4. The method of claim 3, further comprising, after executing the at least one trap instruction and after initiating the debug routine, reading the previously stored copy of the operating instruction from the instruction storage location of the breakpoint table and executing the operating instruction to continue execution of the computer program after invocation of the breakpoint.

5. The method of claim 1, wherein the computer readable memory and a processor configured to execute the instructions in the page of the computer program are disposed within an embedded processor system.

6. The method of claim 5, wherein the embedded processor system comprises a handheld computer device.

7. The method of claim 6, wherein the embedded processor system is an MP3 device.

8. The method of claim 5, wherein the embedded processor system is a personal digital assistant.

9. The method of claim 1, further comprising loading the breakpoint table from a host computer into the computer readable memory.

10. The method of claim 9, wherein the host computer includes a debugger routine that is invoked upon execution of at least one of the trap instructions.

11. The method of claim 1, wherein each task identifier represents a particular program task associated with activation of the breakpoint.

12. The method of claim 11, wherein when a task other than the particular program task is being executed, the breakpoint is disabled by a real-time operating system kernel program before program execution is halted and when the particular program task is being executed, the breakpoint is enabled by the real-time operating system kernel program.

13. The method of claim 1, further comprising adjusting a busy flag to prevent a debugger program from accessing the breakpoint table.

14. The method of claim 1, further comprising evaluating a checksum value associated with the breakpoint table.

15. The method of claim 14, wherein evaluating the checksum value is performed prior to reading the breakpoint table.

16. A method of loading a breakpoint enabled page of a computer program into a computer readable memory, the method comprising:
identifying a page of a computer program to be loaded into the computer readable memory;
prior to loading the page of the computer program, reading a breakpoint table to identify a set of breakpoints having memory addresses located within the page of the computer program, each breakpoint in the set of breakpoints having an instruction address and an instruction storage location;
for each of the set of breakpoints, reading an operating instruction of the page of the computer program located at the instruction address, storing a copy of the operating instruction at the instruction storage location within the breakpoint table, and loading a trap instruction at the instruction address to replace the operating instruction in the page of the computer program, to create a breakpoint enabled page of the computer program;
loading the breakpoint enabled page of the computer program into the computer readable memory; and
loading the breakpoint table from a host computer into the computer readable memory;
wherein the host computer includes a debugger routine that is invoked upon execution of at least one of the trap instructions, wherein the debugger routine is prevented from accessing the breakpoint table while a memory paging routine within an embedded processor system is in the process of generating and then loading the breakpoint enabled page into the computer readable memory.

17. A method of loading a breakpoint enabled page of a computer program into a computer readable memory, the method comprising:
identifying a page of a computer program to be loaded into the computer readable memory;
prior to loading the page of the computer program, reading a breakpoint table to identify a set of breakpoints having memory addresses located within the page of the computer program, each breakpoint in the set of breakpoints having an instruction address and an instruction storage location;
for each of set of breakpoints, reading an operation instruction of page of the computer program located at the instrucrion address, storing a copy of the operating instruction at the instruction storage location within the breakpoint table, and loading a trap instruction at the instruction at the instruction address to replace the operating instruction in the page of the computer program, to create a breakpoint enabled page of the computer program; and
loading the breakpoint enabled page of the computer program into the computer readable memory, wherein the breakpoint enabled page of the computer memory is to be reading the breakpoint table to identify at least one breakpoint having an address located within the second page of the computer program prior to loading the second page of the computer program into the computer readable memory.

18. The method of claim 17, further comprising, for the at least one breakpoint, reading an operating instruction of the second page of the computer program located at the instruction address, storing a copy of the operating instruction at the instruction storage location within the breakpoint table for the at least one breakpoint, and loading a trap instruction at the instruction address to replace the operating instruction in the second page of the computer program, to create a breakpoint enabled second page of the computer program.

19. The method of claim 18, further comprising loading the breakpoint enabled second page of the computer program into the computer readable memory.

20. The method of claim 17, wherein the second page of the computer program is received from an external media source.

21. The method of claim 20, wherein the external media source is selected form a hard disk drive, optical storage, and a flash memory.

22. The method of claim 20, wherein the external media source is within a host computer and wherein the host computer communicates with the computer readable memory using a JTAG interface.

23. An embedded system comprising:
a processor; and
memory accessible to the processor, the memory including:
a breakpoint table including a set of entries, each entry of the set of entries identifying an instruction address and including a storage cell for a replaced instruction and including a task identifier; and
computer implemented instructions operable by the processor to access the breakpoint table and when the task identifier matches a task to be executed to insert a trap instruction associated with each of the set of entries included in the breakpoint table at the identified instruction addresses within a program page prior to loading the program page with the trap instruction for execution, wherein access to the breakpoint table by a debugger routine is prevented during creation and loading of the breakpoint enabled page.

24. The embedded system of claim 23, wherein the memory has an available capacity that is smaller than a program associated with the program page.

25. A system comprising:
a host computer including debugger software; and
an embedded system accessible to the host computer, the embedded system including:
   a processor; and
   memory accessible to the processor, the memory including:
      a breakpoint table including a set of entries, each entry of the set of entries identifying an instruction address associated with an instruction included in a page of a program that is to be replaced by a trap instruction, each entry including a storage cell for storing the replaced instruction, each entry including a task identifier for identifying a task to be executed, wherein the memory includes computer instructions operable by the processor to access the breakpoint table and when the task identifier matches a task to be executed to insert the trap instruction at the instruction address within the page prior to loading the page with the trap instruction for execution, wherein access to the breakpoint table by a debugger routine is prevented during creation and loading of the breakpoint enabled page.

26. The system of claim 25, wherein the breakpoint table is created by the debugger software and transferred to the embedded system.

27. The system of claim 25, wherein a capacity of the memory is less than a size of the program.

28. The system of claim 25, wherein the program is stored on a media source accessible to the memory.

* * * * *